Oct. 19, 1948.    N. C. FOSTER    2,451,935
METHOD OF CAST POLYMERIZATION
Filed July 7, 1944
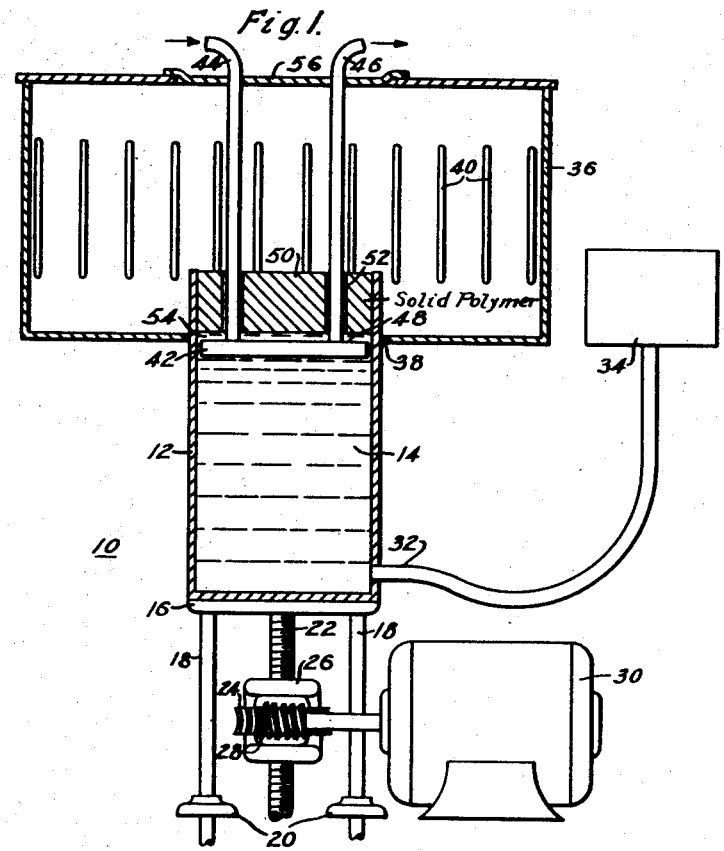
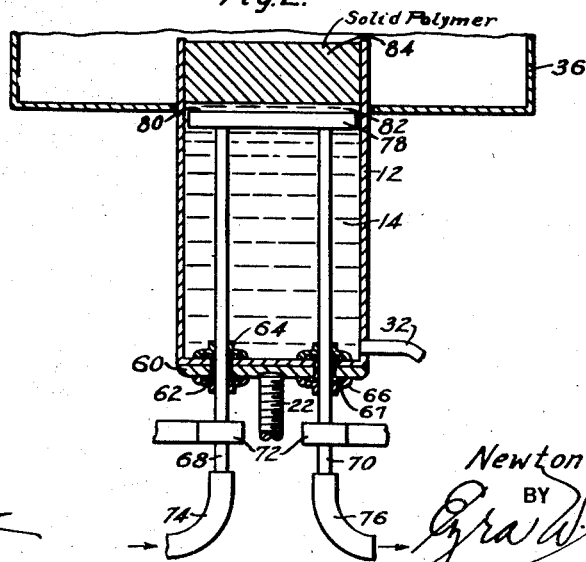
WITNESSES:
INVENTOR
Newton C. Foster.
BY
ATTORNEY Patented Oct. 19, 1948

2,451,935

UNITED STATES PATENT OFFICE 2,451,935

METHOD OF CAST POLYMERIZATION

Newton C. Foster, McKeesport, Pa., assignor to Westinghouse Electric Corporation, East Pittsburgh, Pa., a corporation of Pennsylvania Application July 7, 1944, Serial No. 543,915

1 Claim. (Cl. 260—95)

This invention relates to the preparation of relatively large polymerized resinous bodies and, more particularly, to the preparation of polymerized resinous bodies of the high quality suitable for photoelastic studies.

There is a demand for various applications for relatively large bodies of various polymerized resinous materials of especially uniform properties. Such isotropic bodies are particularly difficult to prepare from thermosetting resinous materials. Photoelastic studies in particular call for thermoset resinous bodies of highly uniform characteristics throughout whereby an accurate study of strains in structures may be made.

Heretofore, the processes of polymerizing certain resinous materials into substantially isotropic masses were of prolonged duration, frequently taking many months to produce a member having roughly an area of 100 square inches by a thickness of 1 inch. Members of this size were considered as the maximum producible on a practical basis. In the study of large or complicated structures, it has been held desirable, but not feasible, heretofore to conduct photoelastic tests with larger and heavier members. Three dimensional photoelastic studies have been especially valuable in many cases but their application to many problems has been hampered by the unavailability of sufficiently large polymerized resinous members of the required quality.

The object of this invention is to provide for polymerizing a polymerizable liquid and to a member of predetermined size having a high degree of uniformity.

A further object of the invention is to provide for polymerizing a body of polymerizable liquid at a high rate of speed and to an isotropic body suitable for photoelastic purposes.

A still further object of the invention is to provide for rapidly polymerizing a thermosetting resinous material into large members having a high degree of uniformity.

Other objects of the invention will, in part, be obvious and will, in part, appear hereinafter. For a fuller understanding of the nature and objects of the invention, reference should be had to the following detailed figures of the drawing, in which:

Figure 1 is a view in elevation, partly sectioned of one form of apparatus; and

Fig. 2 is a fragmentary sectional elevation of a modified form of apparatus.

According to the present invention, it has been found that a body of polymerizable liquid may be progressively and uniformly polymerized under predetermined conditions into a substantially isotropic body of practically any size. Both thermoplastic and thermoset polymers may be prepared readily and rapidly by the process set out herein.

The process of this invention involves the progressive and continuous polymerization by the application of polymerizing agents of a body of polymerizable liquid in a series of consecutive thin layers. The thin layer provides a reaction zone whereby controlled polymerization is carried out. The polymerization thus effected increases the polymerized solid in thin incremental layers of flawless quailty.

Among other advantages, polymerizing a body of composition in thin successive layers avoids the undue liberation of heat that accompanies gross polymerization. By this procedure it has been found possible to avoid the adverse effects of the heat given off by exothermic polymerizing compositions which, it is believed, is the primary cause of the formation of blow holes, cracks and other flaws in the product which results when a body of the liquid composition is polymerized as a whole.

Referring to Fig. 1 of the drawing, there is illustrated one type of apparatus 10 suitable for carrying out the method disclosed herein. The receptacle 12 of the apparatus is of uniform horizontal cross sectional shape and is adapted to carry a body of a heat polymerizable liquid substance 14 to be polymerized into a solid. The container 12 is mounted on a support 16 fitted with vertical guide members 18 slidably disposed for free vertical movement in sleeves 20. The support 16 is fastened to the threaded shaft 22 capable of moving the support vertically. The threaded shaft 22 is threadedly engaged with a worm gear 24 mounted for rotational movement only within the bearing 26 and driven by the worm 28 operated by motor 30. The motor 30 is so constructed and arranged that the motion of the worm 28 may be reversed and adjusted within a wide range of speeds either by means of gearing or by suitable electrical construction and cooperating control mechanism. Upon energizing motor 30, the worm 28 may be operated to cause the threaded shaft 22 to either raise or lower at a predetermined rate of speed. Accordingly, it is possible to control the rate of elevation or lowering of the receptacle 12 at any desired speed.

Since, during polymerization of the body of liquid polymerizable material 14, there may be accompanying changes in the volume of the liquid in receptacle 12, it may be desirable to maintain the total volume in the container approximately constant. To this end, the bottom of the side wall of the receptacle l2 is fitted with a flexible tube 32 attached to a reservoir 34 containing additional quantities of the liquid polymerizable substance 14 to provide for replenishing the liquid in the receptacle.

The receptacle 12 and the associated elevating mechanism is disposed below an oven 36 provided with a closely fitting aperture 38 through which the container 12 may be vertically raised or lowered in accordance with the operation of the motor 30. The oven 36 is shown as provided with a plurality of electrical heating elements 40, as, for instance, electrical resistance members. However, other means of providing heat in the oven 36 may be employed. In some cases heating elements, such as infrared or ultraviolet lamps or combinations thereof with resistance elements may be employed. The source of heat should be capable of close control in order to attain predetermined temperatures in the oven 36.

Suspended by means passing through the roof of the oven 36 is a cooling device 42 fitting into the receptacle 12 and of such dimensions that only a relatively narrow space exists for the passage of liquid substance from below the device 42 to the upper face 48 thereof. The cooling device 42 preferably has a substantially horizontal upper face for reasons that will be hereinafter set forth. The cooling device is supplied with cold water or refrigerant or other fluid cooling substance through an inlet tube 44 passing through the roof of the oven and the warmed fluid cooling substance is exhausted through the outlet tube 46. The inlet and outlet tubes 44 and 46 may also constitute the support means for the cooling device 42, though other adjustable supports may be separately attached to the cooling device 42. The cooling device 42 is perferably a metallic structure characterized by good thermal conductivity having a hollow interior through which the liquid from the inlet 44 may be distributed. Suitable baffling and fluid directing vanes may be placed inside the hollow interior of the device 42 in order to maintain uniformity of temperature.

As shown in Fig. 1 of the drawing the small annular space existing between the periphery of the cooling device 42 and the container 12 provides for the passage of liquid polymerizable substance from below the device to the upper surface, as the container is raised with respect to device 42 by the threaded shaft 22. In some cases, it may be desirable to provide spaced perforations in the device 42 whereby the passage of the liquid from below the device to the upper surface may be facilitated.

To provide for cooling the polymerizable substance to temperatures inhibiting polymerization, the cooling device is supplied with water, preferably chilled water, or some refrigerant, depending on the nature of the polymerizable substance being polymerized. Water at about 5° C. has been found to be an efficient cooling medium in one application of the device. In other cases, liquid refrigerants, such for example as liquid halogenated compounds, liquid ammonia and the like, may be employed.

The operation of the device 10 is as follows. The container 12 is filled to any convenient level with the liquid polymerizable substance to be converted into a solid by thermal polymerization, with a reserve placed in the reservoir 34 to replenish the receptacle 12 as polymerization progresses. The motor 30 is adjusted to operate at a speed depending on the temperature maintained in the oven 36 and the nature and polymerizing characteristics of the polymerizable substance 14. As the receptacle 12 is gradually raised it enters the oven 36 through aperture 38 and the cooling device 42 is plunged beneath the surface of the polymerizable liquid. Upon being subjected to the heat in the oven, the liquid above the cooling device is heated to a temperature sufficiently high to cause polymerization to progress; the oven being maintained at a temperature sufficient for this purpose. Due to the cooling liquid passing through the cooling device 42, the polymerizable liquid immediately adjacent is at a temperature too low for effective polymerization to take place. All the liquid in the receptacle 12 below the device 42 will not polymerize at any time. Accordingly, a thin layer 54 of liquid exists at all times between the mass of polymerized solid 50 and the upper surface 48 of the cooling device. Obviously, the liquid in immediate contact with the surface of the cooling device is at a temperature near that of the device itself. The liquid polymerizable material further away from the upper surface of the cooling device 42 is progressively hotter and eventually a stratum being reached where polymerization takes place at an appreciable rate, while the liquid in contact with the solid material 50 is at a temperature sufficiently high for polymerization to take place at a high rate. The correlation of the temperature of the oven, the temperature of the cooling device and the speed of the motor are selected to assure that continuous and complete polymerization takes place in the liquid layer 54 with the solid 50 progressively and continuously building up in thickness. If the polymerization reaction causes a diminution in the net volume, or the oven temperature results in some evaporation, liquid from the reservoir 34 will enter and replace the volume so diminished. Therefore pockets or holes in the solid are prevented. Due to the effect of the relatively cold tubes 44 and 46, polymerization of the substance is inhibited or prevented adjacent thereto and a thin layer 52 of liquid material is present between the tubes and the solid polymer 50.

It will be apparent that the thin layer 54 of liquid being polymerized should be substantially horizontal in order that the effects of temperature be uniform whereby uniform polymerization takes place. For this reason, the upper surface 48 of the cooling device 42 should be horizontal and planar.

In actual tests, a polymerization rate of from ¼ inch to 1½ inches per hour has been found to be entirely feasible in an apparatus corresponding to that of Fig. 1. In some cases, higher rates of speed may be maintained depending on the material being polymerized and other factors.

After a solid 50 of polymer of predetermined size or thickness has been secured, the oven 36 may be cooled and the receptacle 12 lowered rapidly. The device 42 and tubes 44 and 46, with the solid member 50 disposed thereon may be raised through the door 56 in the roof of the oven and the block 50 slipped off the tubes, which may be made in sections for this purpose. The solid 50 may be sawed, cut or machined into predetermined shape as required.

In order to prevent adhesion of the polymer solid 50 to the sides of the receptacle 12, it is desirable to apply a coating to the surface container 12 of such a nature that the polymer will not adhere thereto. It has been discovered that a tinned receptacle may be treated with mercury and thereby the adhesion of the polymer may be prevented. In some cases, the receptacle 12 may be prepared from glass or other substance which has been coated with a layer of high temperature grease or other parting compound or a plastic yielding substance to accomplish this result.

While the apparatus illustrated in Fig. 1 shows the receptacle 12 as being raised relatively to the oven, it will be appreciated that the oven 36 and the cooling device 42 may be moved vertically instead by a suitable mechanism corresponding to that shown for raising and lowering the receptacle 12.

In order to avoid the apertures produced by the passage of the tubes 44 and 46 through the resinous polymer member 50, a modified form of apparatus, shown in Fig. 2 of the drawing, may be made use of. The receptacle 12 carrying the polymerizable liquid 14, which is moved in a vertical direction by the threaded screw 22, is provided with a perforated support 60, having apertures 62. Packing glands 64 and 66 provided with a suitable packing 67 are disposed in alignment with the apertures 62. The apertures 62 and the glands 64 and 66 provide for the passage respectively. The tubes 68 and 70 are supported against movement by the brackets 72. Cooling fluid is fed to the inlet tube 68 by the flexible tube 74. Likewise, a flexible tube 76 for withdrawal of liquid is connected to the outlet tube 70. The inlet and outlet tubes 68 and 70 support the cooling device 78 having an unobstructed, substantially plane and horizontal upper surface 80. Therefore, the liquid polymerizable substance is disposed as a uniform continuous layer 82 between the unperforated body of polymer solid 84 and the cooling device 78.

Since the apparatus of Fig. 2 is capable of producing a polymerized solid 84 free from any perforation, a minimum of machining or shaping is required to prepare the solid for use.

While an oven of relatively large dimensions has been shown as furnishing the heat to attain polymerization temperatures in the layer of liquid polymer, other means of supplying heat may be employed. Thus, for example, a horizontal heating plate suspended just above the upper edge of the container 12, for example suspended from the tubes 44 and 46, may be made use of. By such a device the penetration of heat through the resinous solid 50 will be substantially uniform at all points. Other means of supplying heat sufficient to attain polymerization may be made use of in carrying out the processes.

For use as the polymerizing liquid 14, it is desirable to employ liquid substances that are substantially completely polymerizable. Practically all polymerizable vinyl and vinylidene monomers are suitable for use in the process described herein. Monomeric styrene, methyl methacrylate, acrylic nitrile, vinyl acetate, alphamethyl styrene, and paramethyl styrene are adapted to polymerization in the apparatus shown. Completely polymerizable thermosetting compositions such for example as alkyds dissolved in vinyl monomers may be similarly polymerized. For example, glycol maleates dissolved in monostyrene have been found to form a thermoset resinous body on being subjected to polymerization in the apparatus shown. To expedite the polymerization from 0.1% to 1% of benzoyl peroxide or other catalyst may be incorporated in the liquid polymerized substance.

The following example is typical of the practice of the invention:

| | Parts |
|---|---|
| Adipic acid | 75 |
| Maleic anhydride | 75 |
| Diethylene glycol | 136 | all parts being by weight, were reacted in a closed reaction vessel for two hours. Fifty parts of the alkyd resin so produced were dissolved in fifty parts of monostyrene and 0.1% of benzoyl peroxide was added. The liquid solution was subjected to polymerization to an apparatus similar to that of Fig. 1 at a temperature of approximately 60° C. in the oven 36. The polymerization proceeded at the rate of ¼ inch per hour. At a temperature of about 175° C., highly uniform bodies were produced at the rate of 1½ inches per hour. The temperature of the cooling water employed in the cooling device 42 was approximately 5° C. Members of 3 inches thickness were produced in about two hours. The surface area of the members depends on the size of the receptacle 12 but apparently is without any limit. It is believed that members of a surface diameter of three feet could be readily produced. The members produced from the resin of this example were substantially isotropic and of a quality suitable for photoelastic studies.

Since certain changes in carrying out the above process and certain modifications in the article which embody the invention may be made without departing from its scope, it is intended that all matter contained in the above description or shown in the accompanying drawing shall be interpreted as illustrative and not in a limiting sense.

I claim as my invention:

The method of polymerizing a liquid composition capable of being substantially completely polymerized by heating into a solid polymer, comprising the steps of confining a body of the liquid composition so that at a given point it is disposed as a thin horizontal plane layer of predetermined cross-section, applying heat to the liquid composition at the thin layer from one side thereof so that at least a part of the liquid in the layer attains the given temperature at which polymerization of the liquid composition takes place, cooling the other side of the layer of liquid composition from a point within the body of the composition over a plane parallel to said layer to maintain at least a part of said layer at a lower temperature at which polymerization does not occur, whereby the composition within the thin layer has a thermal gradient from the one side of said layer to the other and only that portion of the plane surface adjacent the said one side being heated is polymerized, and the remainder of the body of liquid composition is below the polymerization temperature, moving the liquid composition with respect to said first mentioned point in the direction of the heating at a relatively uniform rate so that continuous, progressive polymerization of the liquid composition in thin planar layers takes place, and continuing the relative movement until a solid polymer of predetermined size is produced, the polymer being characterized by a high degree of homogeneity.

NEWTON C. FOSTER.

REFERENCES CITED

The following references are of record in the file of this patent:

UNITED STATES PATENTS

| Number | Name | Date |
|---|---|---|
| 2,057,673 | Fields | Oct. 20, 1936 |
| 2,057,674 | Fields | Oct. 20, 1936 |
| 2,240,618 | Harris et al. | May 6, 1941 |
| 2,343,816 | Sparks | Mar. 7, 1944 |